Aug. 2, 1966     L. H. ABBOT     3,263,494
VISCOMETER
Filed Oct. 21, 1963
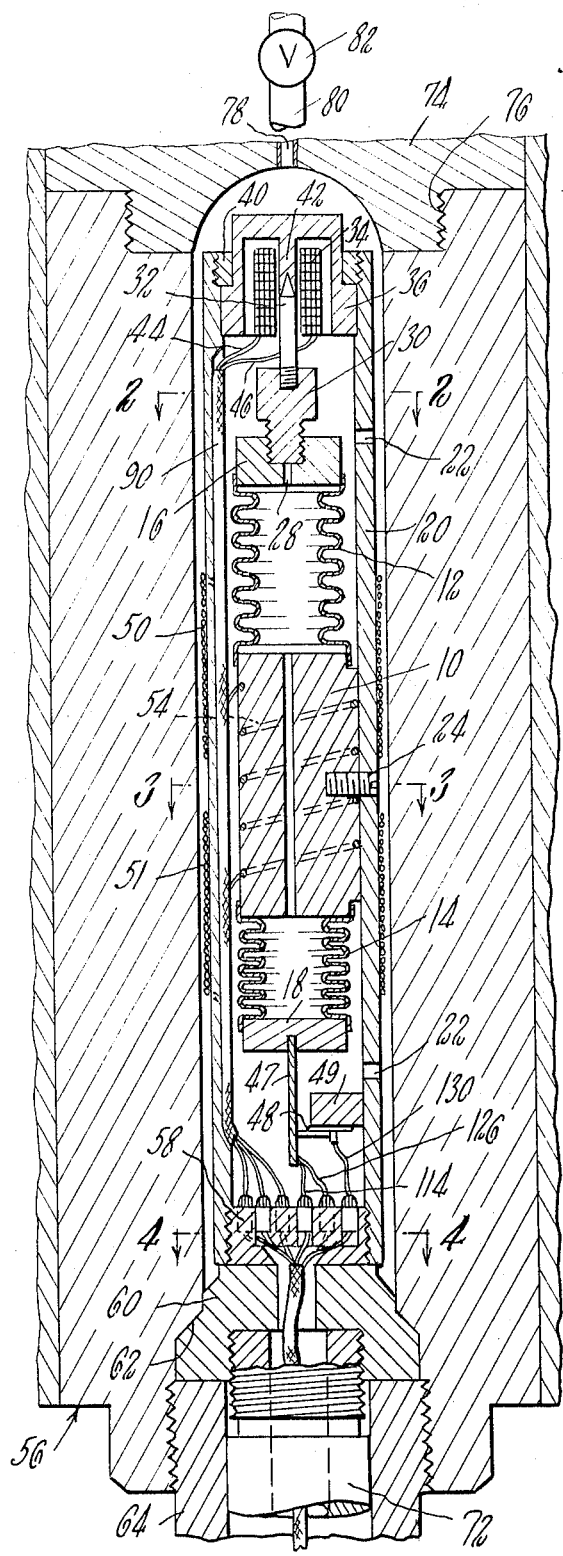
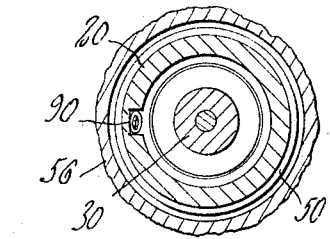
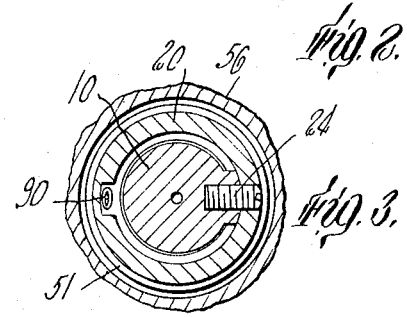
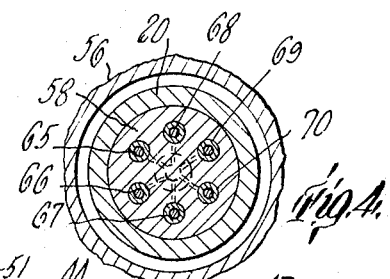
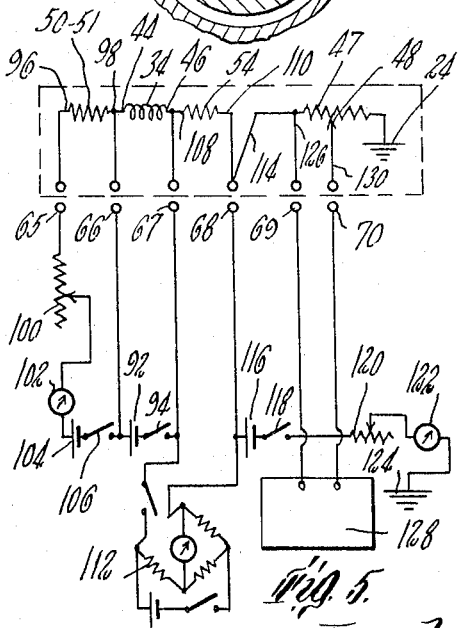
Inventor
Leonard H. Abbot
by Maxwell Fish
Atty.

United States Patent Office 3,263,494
Patented August 2, 1966

1

3,263,494
VISCOMETER
Leonard H. Abbot, Newton, Mass., assignor to Harwood Engineering Company, Walpole, Mass., a corporation of Massachusetts
Filed Oct. 21, 1963, Ser. No. 317,531
7 Claims. (Cl. 73—55)

The present invention relates to improvements in viscometers for measuring the viscosity of liquids.

It is a principal object of the invention to provide an improved viscometer of the so-called capillary type which is constructed and arranged to operate in a simple and improved manner to provide rapid and accurate indications of the viscosity of the tested liquid.

It is a further object of the invention to provide a viscometer which is readily adapted for measuring liquids under any desired conditions of pressure and temperature. It is still another object of the invention to provide a viscometer of the so-called capillary type which is constructed and arranged to be operated by indirect control, as, for example, by electrical means, for the carrying out of one or repeated tests providing an accurate and readily interpreted indication of the viscosity of the tested liquid.

With these and other objects in view as may hereinafter appear the several features of the apparatus and steps of the method of the invention will be readily appreciated by one skilled in the art from the following description taken in connection with the accompanying drawing in which:

FIG. 1 is a sectional view of a viscometer embodying in a preferred form the several features of the invention together with a pressure vessel in which the viscometer is mounted, said view being taken along the longitudinal axis;

FIG. 2 is a sectional view of the viscometer taken on a line 2—2 of FIG. 1;

FIG. 3 is a sectional view of the viscometer taken on a line 3—3 of FIG. 1;

FIG. 4 is a sectional view of the viscometer taken on a line 4—4 of FIG. 1; and

FIG. 5 is a diagrammatic view of the electrical operating system for the viscometer.

The viscometer and method of measuring the viscosity of liquids herein disclosed are intended as an improvement upon the so-called capillary class of viscometers in which the fluid under test is contained under suitable pressure in a reservoir and is allowed to escape through a capillary which is normally maintained in a horizontal position. In accordance with the Hagen-Poiseuille equation, if $\Delta_p$ is the static pressure drop along the capillary, D the internal diameter, Q the volume rate of flow, and $l$ the length of the capillary, the viscosity of the fluid is given as $$U = \frac{\pi \Delta_p D^4}{128 Q l}$$

In the conventional viscometer the internal diameter and length of the capillary are known and the pressure drop and quantity of flow during a predetermined flow are measured. Such devices known in the prior art, however, have the disadvantage that the measurements necessary require access to the viscometer for the making of necessary measurements during the making of the test,

2 and are not adapted for the measurement of the viscosity of a liquid under substantial pressure, where the viscometer to be effective must be contained within a closed vessel and continuously subject to said pressure.

In accordance with the invention applicant discloses a closed liquid viscosity measuring system which comprises a capillary tube to each end of which is attached a spring bellows. This system is filled with the liquid to be tested and sealed. The outer end of one of said bellows is then moved a known distance axially causing liquid to be displaced through the capillary tube from one to the other bellows and the length of the second bellows to be correspondingly altered. If, now, the first-mentioned bellows is now released so that the two bellows are permitted to return to their initial positions, movement of the second bellows during a predetermined time period will constitute a measure of the volume flow rate of the displaced liquid through the capillary tube. Further in accordance with the invention, means, which may, for example, be electrical devices, are provided which are operable by remote control for effecting the desired measurements.

Referring to the accompanying drawing, FIG. 1 discloses a capillary tube 10 which has attached to opposite ends thereof two identical bellows 12 and 14. The outer end of bellows 12 is closed by a cylindrical block 16, and the outer end of bellows 14 by a corresponding block 18, so that the capillary tube and bellows constitute a closed fluid viscosity measuring system. In the embodiment shown the capillary tube 10 and bellows 12, 14 are supported within a tubular cage 20 in the form of a tube which is formed with perforations 22 to provide a free flow of fluid under pressure into and out of the cage against the respective bellows. The capillary tube 10 is rigidly secured in place within the cage 20 by means of a set screw 24.

The plug 16 by means of which the bellows 12 is closed at its upper or outer end is formed with an inlet opening 28 normally closed by means of a screw threaded plug 30. An armature shaft 32 threaded into the upper face of the plug 30 is adapted to be acted upon by a solenoid 34 for the purpose of extending the bellows 12 longitudinally. The solenoid coil 34 is mounted in a cap 36 of soft iron which is fitted into the recessed upper end of the tubular cage 20, and is held in position thereon by an externally threaded lock nut 40 threaded into the upper internal face of the cage. It will be noted that the armature 32 at its upper end is formed with a taper which is adapted to be brought into engagement with a correspondingly tapered stop surface 42 formed within the upper end of the cap member 36. The solenoid 34 is energized through electrical connections consisting of two leads 44, 46 forming part of the electrical control system hereinafter to be described. When the solenoid 34 is energized the bellows 12 will be expanded by a predetermined amount from its normally balanced position to a point determined by the engagement of the upper end of the armature 32 with the V-shaped stop member 42.

In accordance with the invention an electrically operated device is provided for measuring lengthwise movement of the lower end of the bellows 14 sealed by plug 18 which comprises a longitudinally extending slide wire 47 attached to the plug 18 which acts as a variable resistance and is arranged for sliding engagement with a contact element 48 secured by means of a plug 49 to the inner wall of the tubular cage 20.

In order that the fluid viscosity measuring system and more particularly capillary tube 10 may be maintained at the desired temperature during the performance of a test, two heating coils 50 and 51 are mounted on the outer periphery of the tubular cage 20 externally of the capillary tube 10. For controlling the operation of said heating elements there is also provided a thermometer in the form of a high resistance wire 54 which is mounted within a spiral groove formed in the outer periphery of the capillary tube 10.

In the embodiment of the invention shown the fluid viscosity measuring system including the tubular cage 20 above described is rigidly secured into the lower end of a pressure vessel 56. As shown the tubular cage 20 has screw threaded into the lower end thereof a plug 58 which is secured to the upper face of a cap member or plug 60 fitted into a correspondingly journaled aperture 62 in the lower end of the pressure vessel 56 being held in place by a sleeve nut 64 internally screw threaded into a base aperture of the pressure vessel. Six electrical leads 65, 66, 67, 68, 69 and 70 are projected through the bottom plug 58 and through the cap member 60 into a wire conducting tube 72 which is in turn threaded into the cap member 60.

It will be noted that the pressure vessel 56 is formed at its upper end with a large cap 74 which is screw threaded at 76 into a recessed portion of the pressure vessel and forms a convenient means of access to the removable upper end of the fluid viscosity measuring system.

An inlet aperture 78 is provided through the cap 74 and is connected by means of a supply pipe 80 with a fluid pressure source not shown which supplies fluid at a pressure determined by a pressure control valve 82.

The electrical devices above set forth form part of the electrical system diagrammatically shown in FIG. 5 for controlling the operation of the viscometer. From an inspection of FIGS. 1 and 5, it will be noted that the leads 44 and 46 from the solenoid 34 are fed into a cable 90 which extends downwardly along the length of the tubular cage 20 in a groove provided for that purpose, being connected at the lower end of the cable to wires 66 and 67, which are connected by a battery 92 and a manually operated switch 94 operable to energize and de-energize the solenoid. The heater coils 50 and 51 are provided with leads 96 and 98 which enter the cable 90 and are connected at the lower end of the cable with wires 65 and 66 through which are connected in series a variable resistance 100, an ammeter 102, a battery 104, a manually operable control switch 106. The resistance thermometer 54 is provided with leads 108 and 110 which enter the cable 90 and are connected at the lower end of the cable with wires 67 and 68 connected to two corners of a Wheatstone bridge 112. The outer end of the slide wire 47 is connected by means of a lead 114 with the wire 68 providing a circuit from a ground provided by the set screw through which are connected in series slide wire 47, wire connector 114, wire 68, a battery 116, a manual switch 118, a variable resistance 120, an ammeter 122 and a second ground 124.

The variable resistnace provided by movement of the slide wire 47 with relation to the stationary contact 48 is measured by a potentiometer 128, connected by wires 69, 126, 70 and 130 with the slide wire 47 and the stationary contact 48.

The operation of the viscometer for the measurement of the viscosity of a liquid under pressure and at a predetermined temperature is as follows:

The cover 74 of the pressure vessel 56, the cap 36 of the cylindrical cage 20 and the plug 30 for closing the aperture into the bellows 12 are all removed and closed liquid viscosity measuring system comprising the bellows 12, capillary tube 10, and bellows 14 are filled with the liquid to be tested. Thereafter the plug 30, cap 36 and cover 74 are closed and fluid under pressure is admitted to the pressure vessel through inlet 80 at a pressure which may be determined, for example, by pressure regulating valve 82. In the event that the test is to be carried out at a predetermined temperature the switch 106 is closed energizing the heating coils 50, 51. A temperature reading is obtained by balancing the Wheatstone bridge 112, and the variable resistance 100 in the heating circuit is adjusted to a value which will produce the desired amount of heat. The operator now closes switch 94 energizing the solenoid 34 causing armature 32 to be moved upwardly extending the bellows 12 a measured distance determined by the engagement of the upper end of the armature 32 with the stop 42. The distance moved is represented by the symbol $\Delta h$. The pressure external to the bellows 12 and 14 and capillary tube 10 causes the bellows 14 to contract a corresponding distance $\Delta h_{01}$. The operator now releases the switch 94 de-energizing the solenoid 34 so that the bellows 12 is released and contracts, driving the liquid to be tested through the capillary tube 10 into the bellows 14 until the spring pressures between the bellows is again balanced. The flow of fluid is determined by measuring the motion of the bellows 14 by observing the change of electrical resistance of the sector of the slide wire 47 between the stationary contact 48 and the free end of the slide wire. For this purpose the operator closes manual switch 118 thus providing a current along the length of the slide wire 47. The change of electrical resistance between the potentiometer contacts provided by the stationary contact 48 and the end of the slide wire 47 is now measured upon the potentiometer 128. By measuring the change $\Delta R_{01}$ of the resistance of the sector of the slide wire 47 as the outer end of the bellows 12 is pulled the known distance $\Delta h_{01}$ from its rest position to its extended position one can establish the relation $\Delta R / \Delta h$. At a precise time interval $T_{1,2}$, after the release of the bellows 12, as the bellows approaches its rest, the resistance is measured and from the change of resistance $\Delta R_{1,2}$ that occurred during the interval $T_{1,2}$ the corresponding movement $\Delta h_{1,2}$ of the outer end of the bellows 12 can be determined. Among the known properties of the bellows are their spring rate S, (force necessary to deflect axially a given distance), and means effective area A (volume of the closed bellows divided by the length between extreme convolutions). Hence it is possible to determine the pressure $$p_1 = \frac{S \Delta h_{01}}{A}$$

above ambient pressure, of the test liquid when the bellows 12 are pulled to their displaced position; the pressure $$p_2 = \frac{S(\Delta h_{01} - \Delta h_{12})}{A}$$

as the bellows return to rest position, at the time interval $T_{12}$ after release; and the quantity of fluid $$\Delta V_{12} = A(\Delta h_{01} - \Delta h_{12})$$

which has flowed through the capillary during this interval. Setting $$\Delta p = \frac{p_1 + p_2}{2}$$

and $$Q_{12} = \Delta V_{12} T_{12}$$

one can substitute in the Hagen-Poiseuille equation and determine the viscosity.

The operation of the viscometer is illustrated by the following example. Assume a pair of bellows, commercially available, having the following properties;

$S=1225$ lbs. per inch of extension, $A=0.109$ sq. in. means effective area, 25 convolutions of 0.038 in. axial length and 0.007 in. permissible extension per convolution. These are connected by a capilary $1=1.0$ in. long and having an inside diameter $D=0.010$ in. Further, let the system be filled with water at 68.4° F., which is known to have absolute viscosity of 0.01 poise at atmospheric pressure. By application of the Hagen-Poiseuille formula as above described it can be determined that the average flow rate through the capillary is about 0.066 cu. in. per sec.

The invention having been described what is claimed is:

1. A viscometer of the capillary class adapted for determination of viscosity of a fluid according to a viscosity determining equation $$U = \frac{\pi \Delta_p D^4}{128 Q l}$$

stated in terms of static pressure drop $\Delta_p$, and volume rate of flow Q through, and length 1 and internal diameter D of the capillary which comprises, in combination, a closed liquid viscosity measuring system having as elements thereof a capillary tube of known internal diameter D and length $l$, a longitudinal expandable and retractable spring bellows having a known spring rate and a known mean effective area attached to each end of said capillary tube in a normally spring balanced relation, access means through which the elements of said closed system are filled with the liquid to be tested, means for stressing said bellows into an unbalanced spring tensed position in which one of said bellows is elongated and the other bellows is shortened, and in which liquid from the shortened bellows is passed through the capillary tube into the elongated bellows, and for thereafter releasing said bellows for return to said normally spring balanced position, and means for measuring the change of length of said bellows while returning to said balanced position for a predetermined time interval for the determination of pressure drop and volume rate of flow in said equation thereby providing a determination of $\Delta_p$ of said equation in terms of the spring rate S times said change of length of said bellows divided by said known mean effective area A.

2. The combination of claim 1, in which the device for measuring the change of length of said bellows comprises a rod movable axially with the bellows, an electrical circuit through the rod including a stationary contact engaging the rod and a contact fixed to the rod, and means for measuring variations in the electrical resistance of said circuit.

3. A viscometer of the capillary class adapted for the determination of viscosity of a fluid which comprises, in combination, a support, a closed liquid viscosity measuring system mounted on said support having as elements thereof a capillary tube secured to said support, a longitudinally expandable and contractable spring bellows attached to each end of said capillary tube in a normally spring balanced relation, access means through which the elements of said closed system are filled with the liquid to be tested, releasable means connected between said support and one of said bellows for varying the length of one of said bellows thereby effecting an inverse lengthwise distortion of the other said bellows to an unbalanced spring tensed position and a corresponding reapportionment of the contained liquid between said bellows, and for thereafter releasing said bellows for return to said balanced position, and means connected between the other said bellows and said support for measuring the change of length of said other bellows during a predetermined time interval during the return of said bellows to said balanced position.

4. A viscometer of the capillary class adapted for the determination of viscosity of a liquid under pressure which comprises, in combination, a perforated enclosure arranged to be immersed in a fluid pressure medium, a closed viscosity measuring system within said enclosure having as elements thereof a capillary tube rigidly mounted within said enclosure, a longitudinally expandable and contractable spring bellows attached to each end of said capillary tube in a normally balanced relation, access means through which the elements of said closed system are filled with the liquid to be tested, a releasable device connected between said enclosure and the free end of one of said bellows for extending said bellows thereby effecting a corresponding longitudinal contraction of the other said bellows and a corresponding reapportionment of the liquid between said bellows, and thereafter releasing said bellows for return to said balanced position, control means for actuating said device to release said bellows, and a measuring device connected between the other said bellows and said enclosure and including a separate indicating means for measuring the increase in length of said bellows during the return of said bellows to said balanced position.

5. Apparatus for the determination of viscosity of a fluid under a predetermined pressure which comprises, in combination, a pressure vessel, and means for supplying fluid at a predetermined pressure to said vessel, an elongated perforated enclosure mounted within said vessel, a closed viscosity measuring system within said enclosure having as elements thereof a capillary tube rigidly mounted within said enclosure, a longitudinally expandable and contractable spring bellows attached to each end of said capillary tube in a normally balanced relation, access means through which the elements of said closed system are filled with the liquid to be tested, releasable means connected between said enclosure and one of said bellows for varying the length of said bellows thereby effecting an inverse lengthwise distortion of the other said bellows and a corresponding reapportionment of the contained liquid between said bellows, and thereafter releasing said bellows for return to said balanced position, a measuring device connected between the other said bellows and said enclosure and including a separate indicating means located externally of said pressure vessel for measuring the change in length of said other bellows during the return of said bellows to said balanced position, and control means located externally of said pressure vessel for actuating said device to release said bellows.

6. Apparatus for the determination of viscosity of a fluid at a predetermined pressure and temperature according to claim 5 in which there is included a heating device mounted externally of said enclosure, a thermometer comprising a pressure sensitive element attached to said capillary tube for measuring the temperature of said closed viscosity measuring system, and temperature indicating means supported externally of said pressure vessel, and manually operable means for adjusting the temperature of said heating element.

7. A viscometer of the capillary class adapted for the determination of viscosity of a liquid under pressure which comprises, in combination, a perforated enclosure arranged to be immersed in a fluid pressure medium, a closed viscosity measuring system within said enclosure having as elements thereof a capillary tube rigidly mounted within said enclosure, a longitudinally expandable and contractable spring bellows attached to each end of said capillary tube in a normally balanced relation, access means through which the elements of said closed system are filled with the liquid to be tested, a solenoid comprising magnet and armature elements connected between the enclosure and the free end of one of said bellows acting when energized to effect a predetermined variation in the length of said bellows thereby effecting an inverse lengthwise distortion of the other said bellows and a corresponding reapportionment of the contained liquid between said bellows, a measuring device comprising a slide bar secured to the free end of the other said bellows, and a cooperating contact element fixedly mounted on said enclosure, electrical connections for energizing and de-energizing said solenoid to stress and to release said first-mentioned bellows, means for supplying a current through said slide bar, a potentiometer, and potential contacts between said poteniometer and said stationary contact member and a fixed point on said slide bar for measuring the return movement of said slide bar and thereby the length variation of said other bellows.

References Cited by the Examiner

UNITED STATES PATENTS 2,503,660    4/1950    Exline et al. _____ 73—56

FOREIGN PATENTS 1,318,279    1/1963    France.
  899,323    6/1962    Great Britain.
  939,535    10/1963    Great Britain.

DAVID SCHONBERG, *Primary Examiner.*